(12) United States Patent
Moreau et al.

(10) Patent No.: US 11,460,645 B2
(45) Date of Patent: Oct. 4, 2022

(54) OPTICAL CONNECTOR DEVICE

(71) Applicants: Connecteurs Electriques Deutsch, Evreux (FR); Tyco Electronics UK Ltd., Swindon (GB)

(72) Inventors: Jean-Luc Moreau, Evreux (FR); Thierry Cassar, Evreux (FR); Christophe Prel, Swindon (GB); Matthew Hopwood, Swindon (GB)

(73) Assignees: Tyco Electronics UK Ltd., Swindon (GB); Connecteurs Electriques Deutsch, Evreux (FR)

( * ) Notice: Subject to any disclaimer, the term of this patent is extended or adjusted under 35 U.S.C. 154(b) by 0 days.

(21) Appl. No.: 17/177,648

(22) Filed: Feb. 17, 2021

(65) Prior Publication Data

US 2021/0263223 A1 Aug. 26, 2021

(30) Foreign Application Priority Data

Feb. 20, 2020 (EP) ..................................... 20305164

(51) Int. Cl.
*G02B 6/38* (2006.01)

(52) U.S. Cl.
CPC .......... *G02B 6/387* (2013.01); *G02B 6/3817* (2013.01); *G02B 6/3826* (2013.01); *G02B 6/3849* (2013.01)

(58) Field of Classification Search
None
See application file for complete search history.

(56) References Cited

U.S. PATENT DOCUMENTS 10,234,635 B1 * 3/2019 Fabian ............... H01R 13/5221
2016/0004016 A1 1/2016 Zimmel et al.

FOREIGN PATENT DOCUMENTS

| EP | 3447555 A1 | 2/2019 |
| EP | 3514589 A1 | 7/2019 |
| WO | 2015028433 A1 | 3/2015 |
| WO | 2018144128 A2 | 8/2018 |

OTHER PUBLICATIONS

European Search Report, dated Jun. 30, 2020, 8 pages.

* cited by examiner

*Primary Examiner* — Jerry Rahll
(74) *Attorney, Agent, or Firm* — Barley Snyder

(57) ABSTRACT

A connector device includes a first connector part and a second connector part. The first connector part has a first outer housing and a first sub-assembly accommodated in the first outer housing. The first sub-assembly has a first ferrule and a first latch member fastening the first sub-assembly to the first outer housing. The second connector part has a second outer housing and a second sub-assembly accommodated in the second outer housing. The second sub-assembly having a second ferrule and a second latch member fastening the second sub-assembly to the second outer housing. The second outer housing mating with the first outer housing in a state of coupling the first connector part to the second connector part.

23 Claims, 10 Drawing Sheets

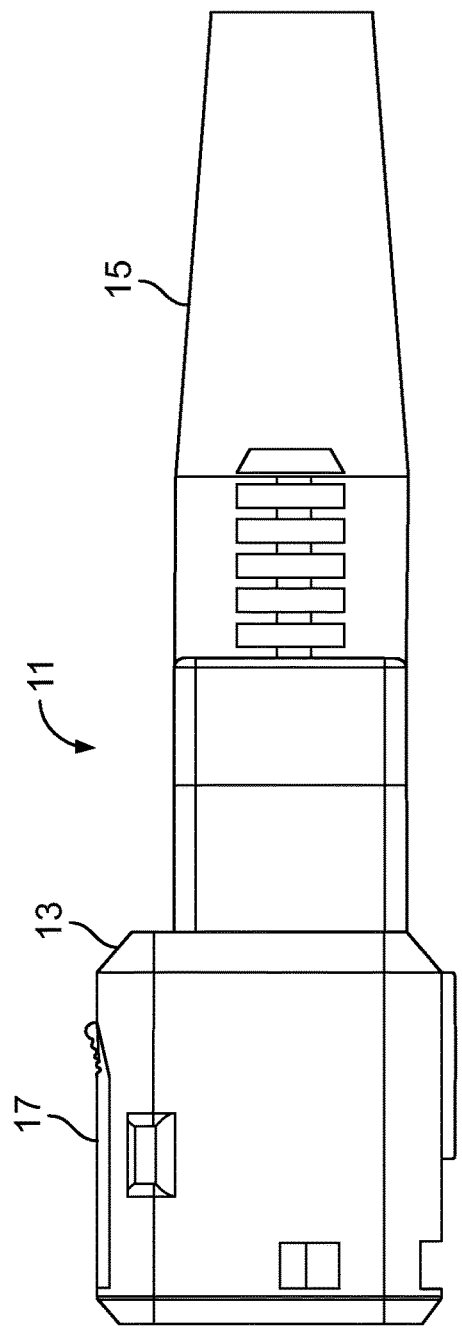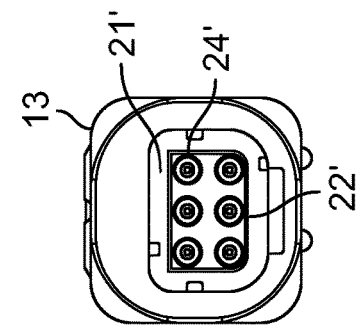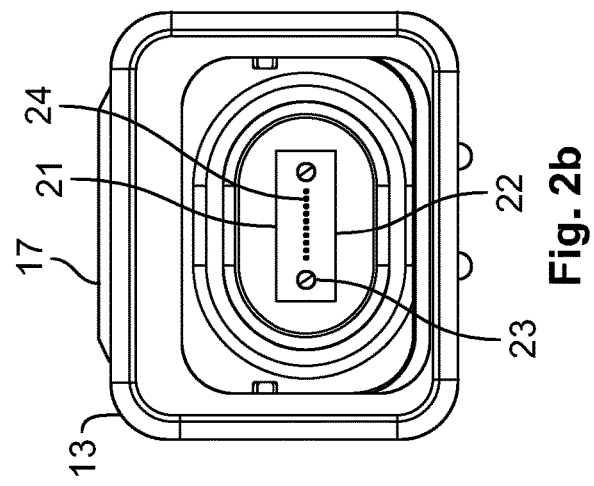

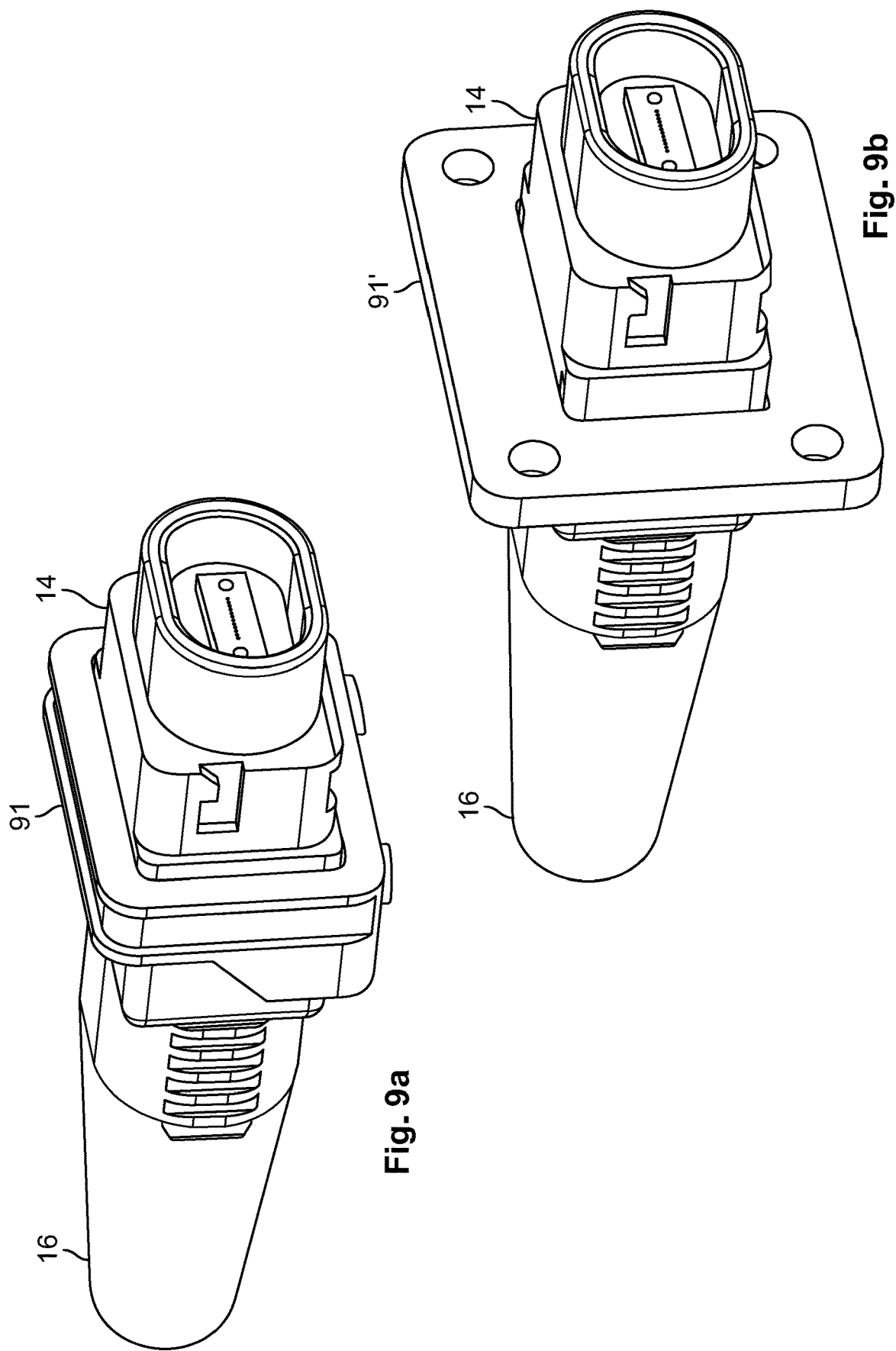

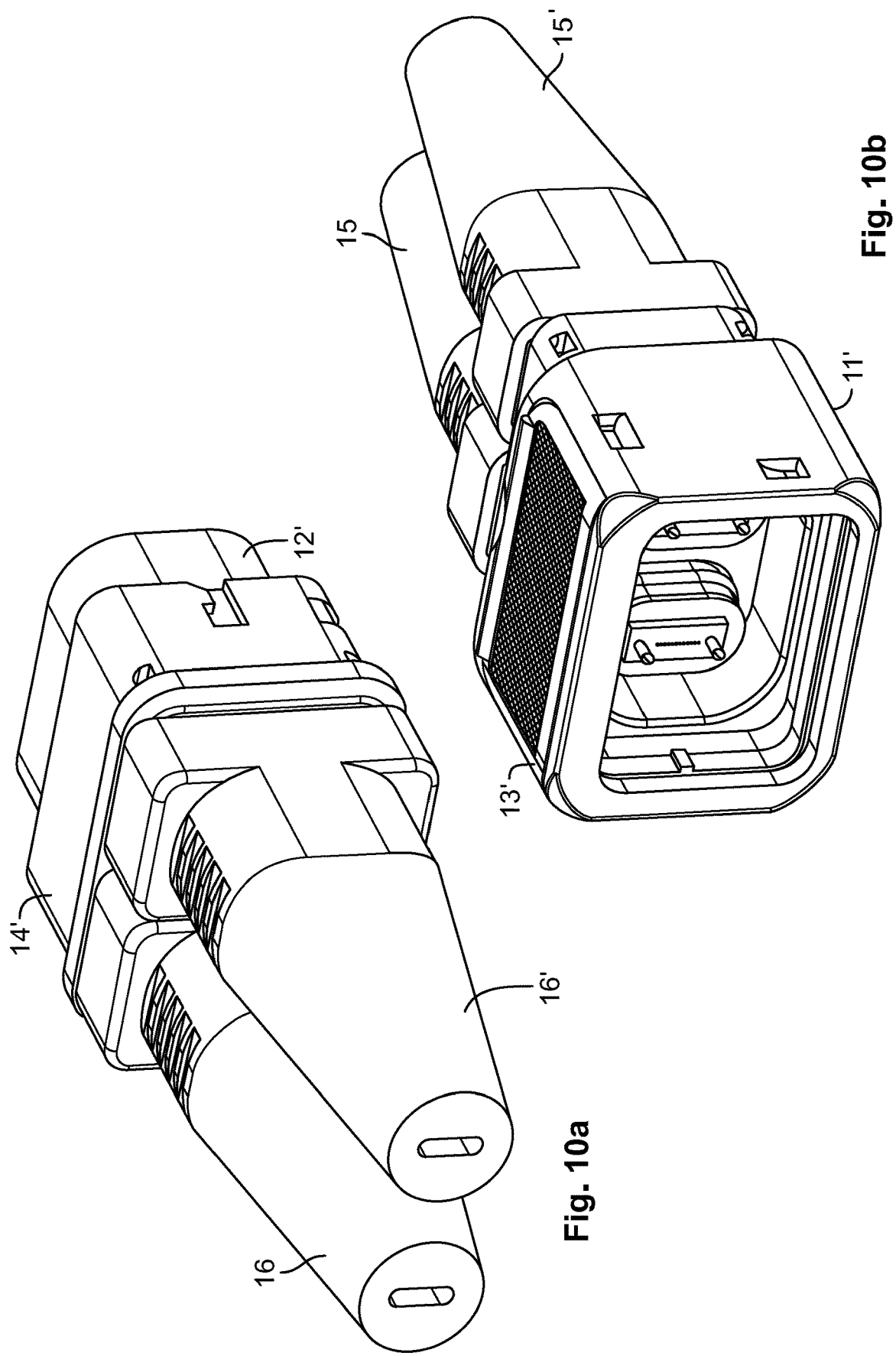

OPTICAL CONNECTOR DEVICE

CROSS-REFERENCE TO RELATED APPLICATION

This application claims the benefit of the filing date under 35 U.S.C. § 119(a)-(d) of European Patent Application No. 20305164, filed on Feb. 20, 2020.

FIELD OF THE INVENTION

The present invention relates to a connector device and, more particularly, to an optical connector device for connecting optical fibers.

BACKGROUND

Fiber optic communication systems are becoming prevalent in part because service providers want to deliver high bandwidth communication capabilities (e.g., data and voice) to customers in different environments. Fiber optic communication systems employ a network of fiber optic cables to transmit large volumes of data and voice signals over relatively long distances.

Optical fiber connectors represent important parts of fiber optic communication systems. Fiber optic connectors allow two optical fibers or a plurality of optical fibers to be quickly optically connected without requiring a splice. Fiber optic connectors can be used to optically interconnect two lengths of optical fiber or to interconnect lengths of optical fiber to some equipment.

One type of fiber optic connectors can be referred to as a ferrule-less fiber optic connectors. In a ferrule-less fiber optic connector, an end portion of an optical fiber corresponding to the ferrule-less fiber optic connector is not supported by a ferrule. Instead, the end portion of the optical fiber is a free end portion. Fiber optic adapters can be used to assist in optically coupling together two ferrule-less fiber optic connectors.

Another type of conventional fiber optic connector is a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers.

Despite recent engineering progress, however, the reliability of connections between individual optical fibers and appliances is still not considered sufficient, in particular in harsh environments that are characterized by vibrations, high or low temperatures, etc. Moreover, locking and unlocking the connections often represents a cumbersome task that is time consuming and demands specialized tools.

SUMMARY

A connector device includes a first connector part and a second connector part. The first connector part has a first outer housing and a first sub-assembly accommodated in the first outer housing. The first sub-assembly has a first ferrule and a first latch member fastening the first sub-assembly to the first outer housing. The second connector part has a second outer housing and a second sub-assembly accommodated in the second outer housing. The second sub-assembly having a second ferrule and a second latch member fastening the second sub-assembly to the second outer housing. The second outer housing mating with the first outer housing in a state of coupling the first connector part to the second connector part.

BRIEF DESCRIPTION OF THE DRAWINGS

The invention will now be described by way of example with reference to the accompanying Figures, of which:

FIG. 2a is a side view of a plug connector part of the connector device;

FIG. 2b is an end view of the plug connector part;

FIG. 2c is an end view of a plug connector part according to another embodiment;

FIG. 9a is a perspective view of a receptacle connector part according to an embodiment;

FIG. 9b is a perspective view of a receptacle connector part according to another embodiment;

FIG. 10a is a perspective view of a receptacle connector part according to another embodiment; and FIG. 10b is a perspective view of a plug connector part according to another embodiment.

DETAILED DESCRIPTION OF THE EMBODIMENT(S)

Features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

The present invention provides a connector device configured for connecting optical fibers to each other, in particular, to provide for a (simplex)multi optical data connection. The connector device comprises a plug connector part and a receptacle connector part and a pair of ferrules for accommodating ends of optical fibers of different optical cables, respectively. The connector device provided herein is particularly suitable for operation in harsh environments, for example, in aerospace applications. It goes without saying, however, that the provided connected device is not restricted to such applications.

Figure 1:
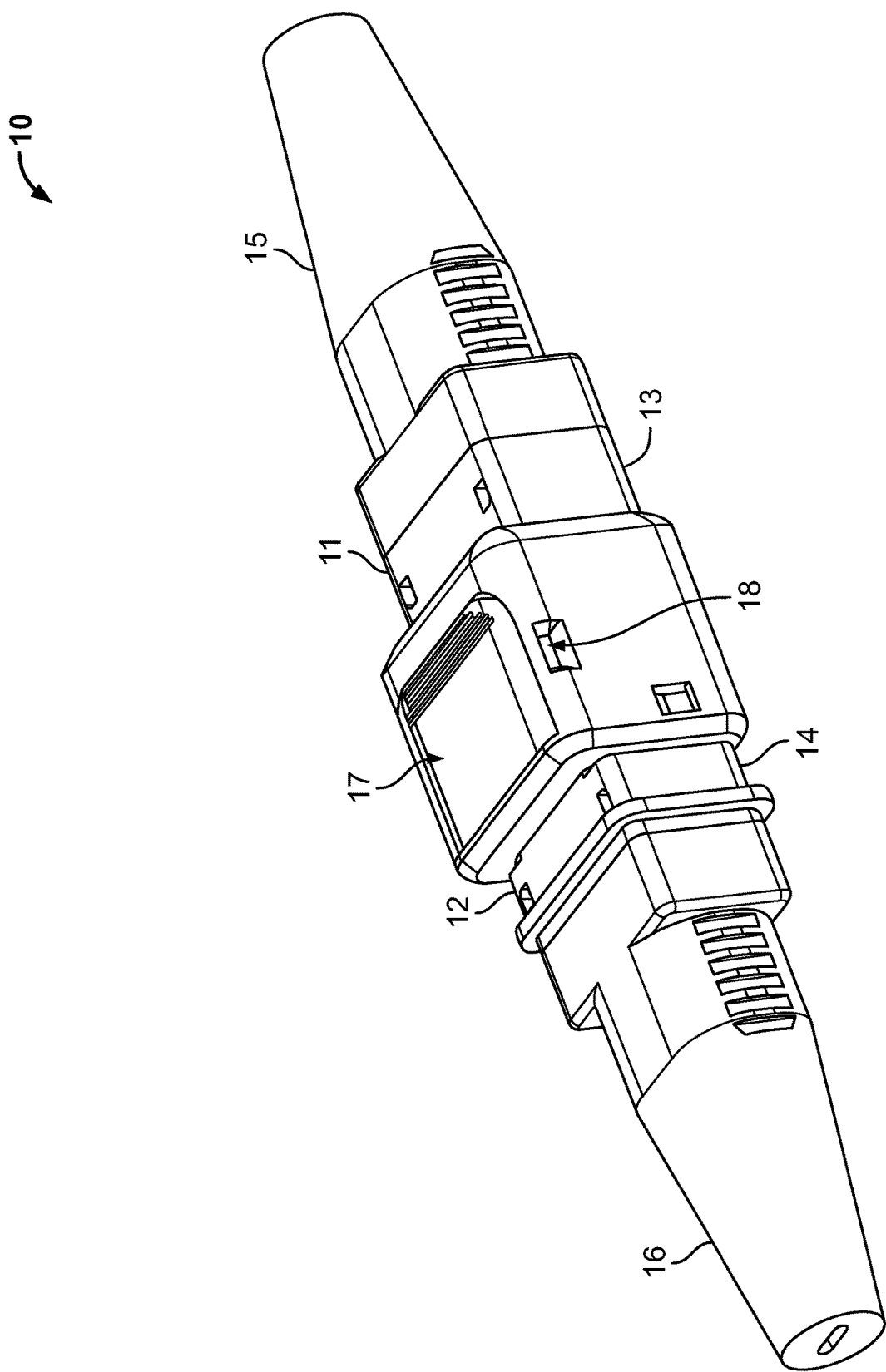
FIG. 1 is a perspective view of a connector device according to an embodiment.

A connector device 10 according to an embodiment is shown in FIG. 1. The connector device 10 comprises a plug connector part 11 and a receptacle connector part 12. The plug connector part 11 and the receptacle connector part 12 may comprise or consist of plastic materials, in an embodiment, the same plastic material. In fact, the connector device 10 can be made entirely of a metal-free material in order to create an interference free signal environment.

Throughout the specification, the plug connector part 11 may be referred to as a first connector part and the receptacle connector part 12 may be referred to as a second connector part. Where elements of the plug connector part 11 described below share a common reference label with elements of the receptacle connector part 12 described below, the element of the plug connector part 11 may be referred to as a "first" element and the element of the receptacle connector part 12 may be referred to as a "second" element.

In the configuration shown in FIG. 1 the plug connector part 11 and the receptacle connector part 12 are coupled to each other. The plug connector part 11 has a plug outer housing 13 and the receptacle connector part 12 has a receptacle outer housing 14. Moreover, the plug connector part 11 has a plug part sleeve 15 and the receptacle connector part 12 has a receptacle part sleeve 16. The plug part sleeve 15 and the receptacle part sleeve 16 are suitable for accommodating portions of respective optical fibers/cables (not shown in FIG. 1) that are to be connected to each other by the connector device 10. The first sleeve 15 may accommodate a part of a first optical cable and the second sleeve 16 may accommodate a part of a second optical cable. The plug part sleeve 15 and the receptacle part sleeve 16 may comprise or consist of a silicone material, for example.

Coupling of the plug connector part 11 and the receptacle connector part 12 can be locked and unlocked by a locking device 17, shown in FIG. 1, formed in the plug outer housing 13. In other embodiments related to an extender configuration the locking device 17 may be omitted. Moreover, a channel/lug portion 18 is formed in the plug outer housing 13 through which some attachment tape can be guided for further securing the coupling between the plug connector part 11 and the receptacle connector part 12.

In an embodiment, the plug connector part 11 and the receptacle connector part 12 of the connector device 10 illustrated in FIG. 1 may have longitudinal extensions in the range of 4 to 6 cm. The plug connector part 11 may be formed with a larger longitudinal size than the receptacle connector part 12. Latitudinal dimensions of the plug connector part 11 and the receptacle connector part 12 of the connector device 10 illustrated in FIG. 1 may lie in the range of 1.5 to 2 cm, for example, and the heights may lie in a range of 1 to 2 cm. The plug connector part 11 may have a larger height and a larger lateral extension than the receptacle connector part 12.

The plug connector part 11 of the connector device 10 illustrated in FIG. 1 disassembled from the receptacle connector part 12 of the connector device 10 illustrated in FIG. 1 is shown in FIG. 2a. FIG. 2b shows a cross section of the plug connector part 11. In the cross section of the plug connector part 11, a plug connector sub-assembly 21 comprising a plug ferrule 22 can be seen. Two guiding pins 23 extend from a top surface of the plug ferrule 22. Ends of optical fibers 24 are supported by the plug ferrule 22 of the plug connector sub-assembly 21.

Another example of a plug connector sub-assembly 21' comprising another plug ferrule 22' supporting six ends of optical fibers 24' in two rows is illustrated in FIG. 2c. It is noted that a coupling of the plug outer housing 13 to the plug connector sub-assembly 21, 21' may also be locked/unlocked by the above-mentioned locking device 17 provided in the plug outer housing 13.

The connector device 10 connects a first set of optical fibers 24 and a second set of optical fibers 24' to each other, for example, for simplex data connection. By this configuration, reliable and fast connection of the first and second sets of optical fibers (for example, of a first optical cable and a second optical cable, respectively) to each other is made possible without the need of any specialized tool. A part of the first/second optical set of fibers can be guided through the sleeve 15, 16 for connection with the first/second sub-assembly 21, 21'. In particular, the first/second sleeve 15, 16 partly seals the first/second set of optical fibers against the environment.

Figure 3A:
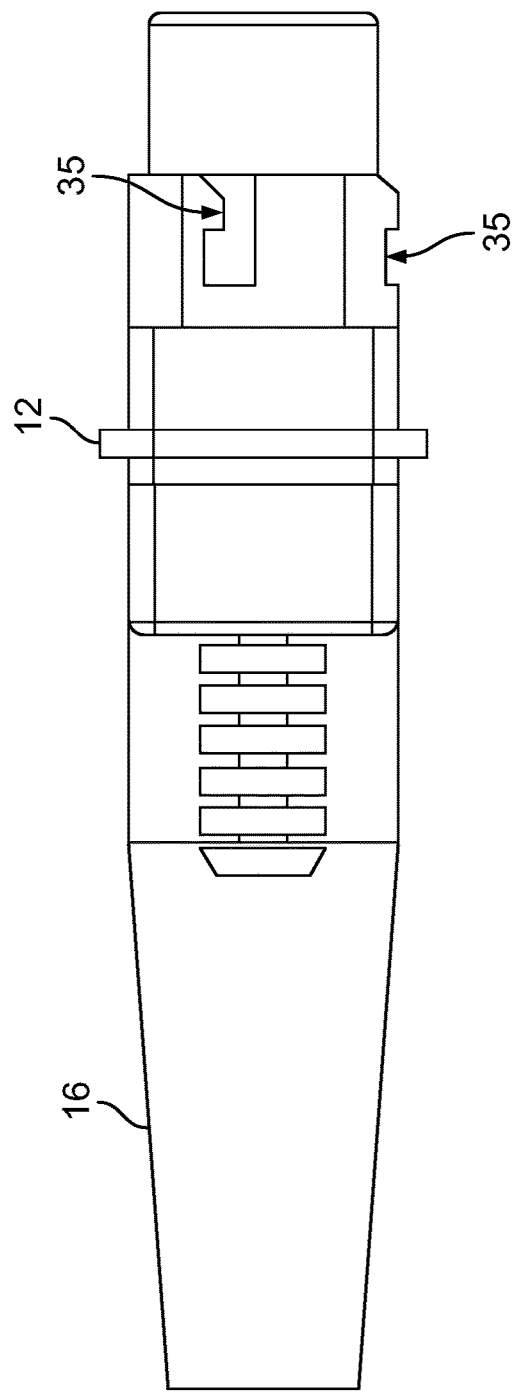
FIG. 3a is a side view of a receptacle connector part of the connector device.

The receptacle connector part 12 of the connector device 10 illustrated in FIG. 1 disassembled from the plug connector part 11 of the connector device 10 illustrated in FIG. 1 is shown in FIG. 3a. The receptacle connector part 12 has (formed in the receptacle outer housing 14) a receptacle fastening device 35 for interlocking with a fastening device of the plug connector part 11. The receptacle fastening device 35 may include a harpoon extension region and a chamfered region, for example. The fastening device 34 of the plug connector part 11 may also include a harpoon extension region and a chamfered region, for example.

Figure 3B:
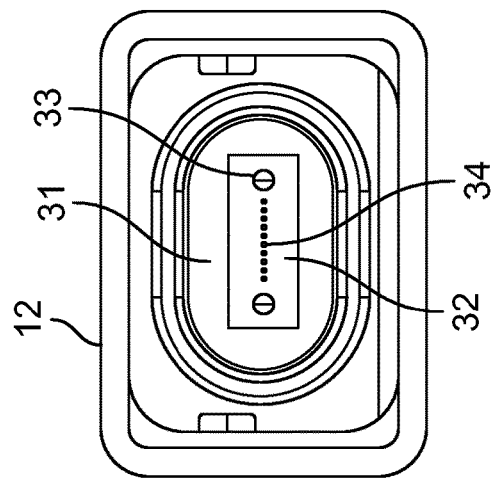
FIG. 3b is an end view of the receptacle connector part.

FIG. 3b shows a cross section of the receptacle connector part 12. In the cross section of the receptacle connector part 12, a receptacle connector sub-assembly 31 having a receptacle ferrule 32 can be seen. Two guiding holes 33 are formed in the receptacle ferrule 32 that match the guiding pins 23 extending from the plug ferrule 22 of the plug connector part 11. By the guiding pins 23 and holes 33, accurate alignment of the ferrules 22, 32 with each other and, thus, the optical fibers, can be guaranteed. Ends of optical fibers 34 are supported by the receptacle ferrule 32 of the receptacle connector sub-assembly 31.

The connector device 10, in an embodiment, may house one or more inserts and one optical cable per insert. The housed cable may consist of or comprise multiple optical fibers. Each insert may house a ferrule and the ferrule may support multiple optical fibers.

Figure 4:
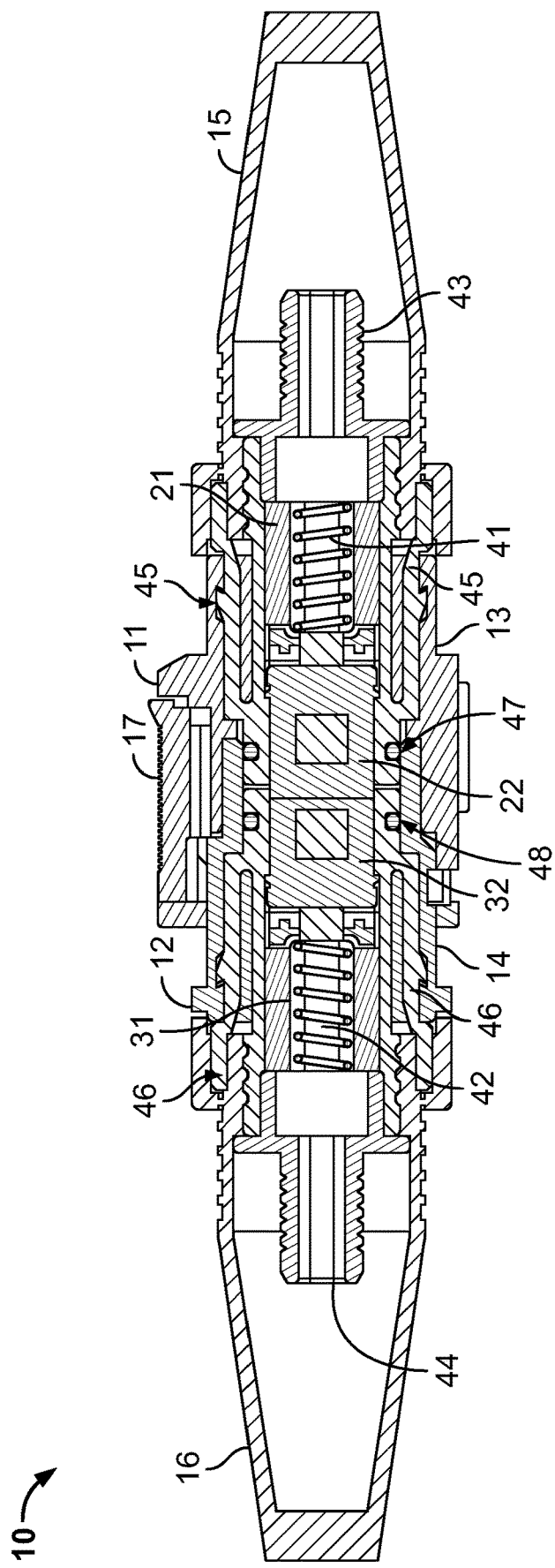
FIG. 4 is a sectional side view of the connector device.

FIG. 4 shows the connector device 10 illustrated in FIG. 1 in a longitudinal cut exhibiting the interior of the plug outer housing 13 and receptacle outer housing 14, respectively. FIG. 4 shows the plug connector part 11 and the receptacle connector part 12 coupled to each other. The plug connector part 11 has the plug outer housing 13, the plug connector sub-assembly 21 and the plug part sleeve 1. The receptacle connector part 12 has the receptacle outer housing 14, the receptacle connector sub-assembly 31 and the receptacle part sleeve 16. The plug connector sub-assembly 21 has the plug ferrule 22 and the receptacle connector sub-assembly 31 has the receptacle ferrule 32. In the coupling state shown, the plug ferrule 22 and the receptacle ferrule 32 abut each other in order to provide for the optical connection of optical fibers to be connected by the connector device 10.

The plug connector sub-assembly 21 of the plug connector part 11 of the connector device 10 shown in FIG. 4 has a spring member 41 and the receptacle connector sub-assembly 31 of the receptacle connector part 12 has another spring member 42. Spring members 41 and 42 are provided in order to bias the plug connector part 11 relative to the plug outer housing 13 and the receptacle connector part 12 relative to the receptacle outer housing 14, respectively. Additionally, the plug connector sub-assembly 21 has a boot 43 and the receptacle connector sub-assembly 31 has another boot 44. Optical fibers can be guided by the boots 43, 44. The boots 43, 44 are adapted to receive and provide strain relief to optical fibers/fiber optic cables to which the connector device 10 is secured on the plug and receptacle sides, respectively.

The plug connector sub-assembly 21 has two latch members 45 and the receptacle connector sub-assembly 31 has two latch members 46, as shown in FIG. 4. The latch members 45 and 46 are elastically deformable and configured for a clipping securement to the plug outer housing 13 and the receptacle outer housing 14, respectively. For this, the latch members 45 and 46 may have harpoon like extensions matching with respective recesses formed in the plug outer housing 13 and the receptacle outer housing 14. Moreover, longitudinal extensions of the latch members 45 and 46 fit into matching recesses of front portions of the sleeves 15 and 16, respectively, in order to secure the sleeves 15, 16 to the plug connector part 11 and the receptacle connector part 12, respectively. By the latch members 45 and 46, a secure mechanical and optical connection of the first and second connector parts 11 and 12 and, thus, the first and second sets of optical fibers, can be facilitated.

As shown in FIG. 4, a sealing ring 47 is provided for sealing the plug connector sub-assembly 21 and the plug outer housing 13 and another sealing ring 48 is provided for sealing the receptacle connector sub-assembly 31 and the receptacle outer housing 14. The sealing rings 47 and 48 may be made of or comprise silicone.

Figure 5:
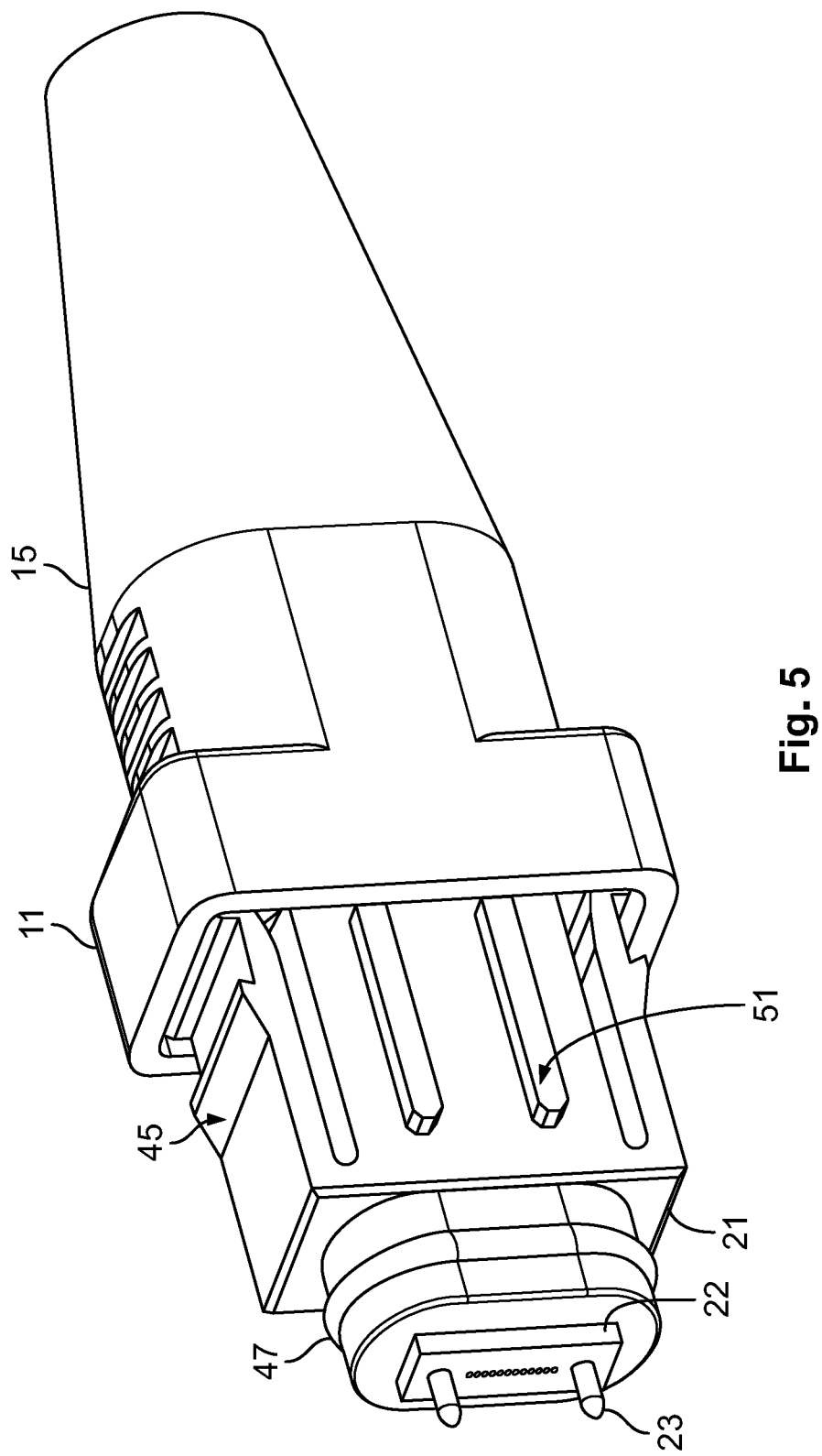
FIG. 5 is a perspective view of the plug connector part connected to a sleeve.

Details of the plug connector part 11 connected to the sleeve 15 are shown in FIG. 5. The plug connector part 11 is secured to the sleeve 15 by the latch member 45. The plug ferrule 22 is accommodated in the plug connector sub-assembly 21 and has two guiding pins 23 for alignment with the corresponding receptacle ferrule 31 of the receptacle connector sub-assembly 31 (confer FIG. 4). Moreover, the plug connector sub-assembly 21 has guiding keys/rails 51 on side surfaces of the same. When coupling the plug connector sub-assembly 21 to the plug outer housing 13, the keys 51 may be inserted into matching guiding grooves formed in inner surfaces of the plug outer housing 13. Coupling the plug connector sub-assembly 21 to the plug outer housing 13 is facilitated by the provision of the keys 51. Similarly, the receptacle connector sub-assembly 31 described above may also have such kind of guiding keys and the receptacle outer housing 14 may also have guiding grooves.

Figure 6:
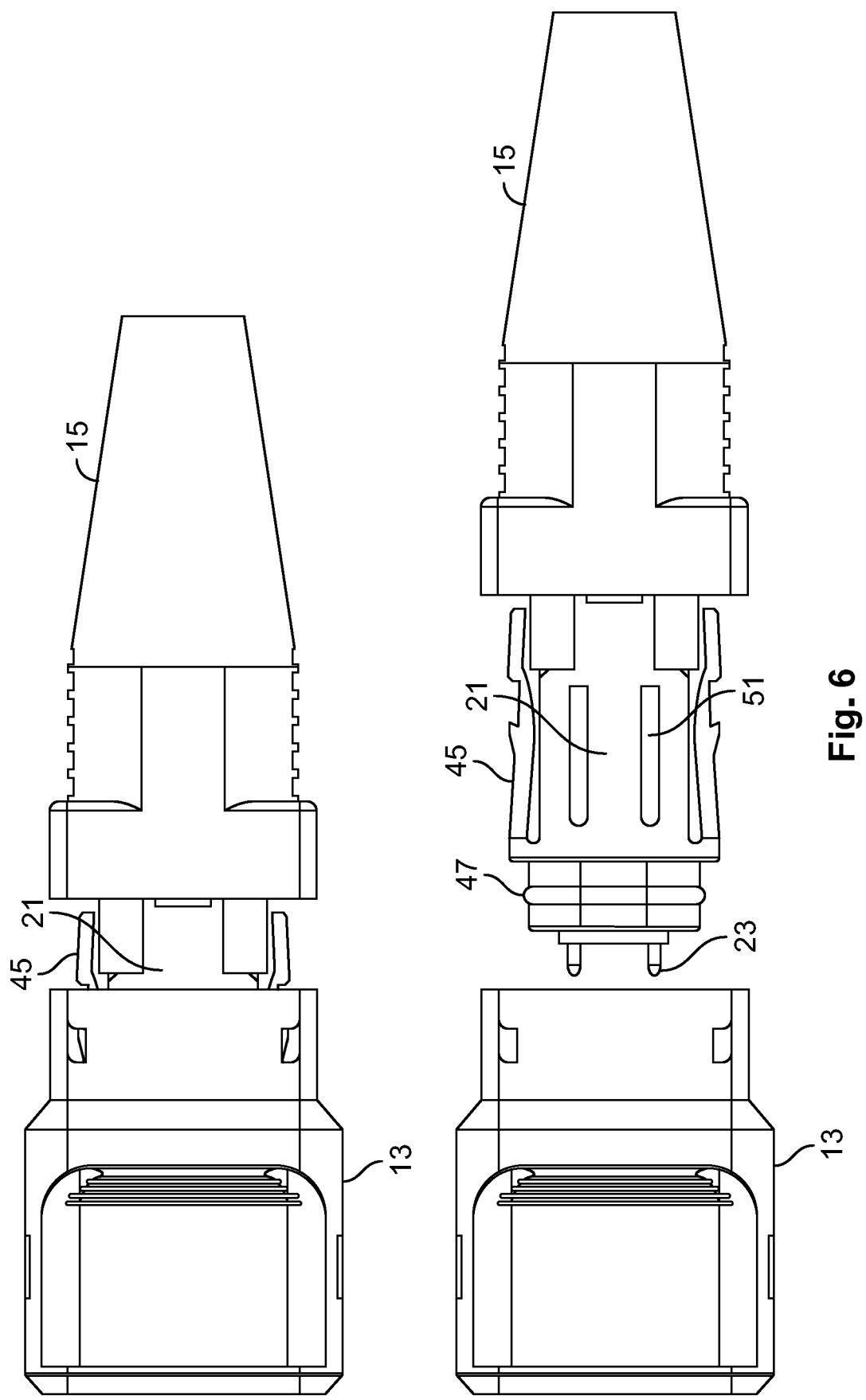
FIG. 6 is a top view of a detachment of a sub-assembly of the plug connector part from a plug outer housing.

A process of decoupling of the plug connector sub-assembly 21 (and, thus, the sleeve 15 and optical fibers) from the plug outer housing 13 is illustrated in FIG. 6. In the coupling state of the plug connector part 11 and the receptacle connector part 12, the sleeve 15 is pulled away from the plug outer housing 13 in the longitudinal direction. By this pull movement, the latch members 45 that previously were covered by the plug outer housing 13 are exposed and can be pressed by a user's hand towards the longitudinal axis of the plug connector sub-assembly 21. Thereby, the fastening of the plug connector sub-assembly 21 to the plug outer housing 13 provided by the latch members 45 is released. For example, the harpoon extensions of the latch members 45 (see FIG. 4) are moved away from matching recesses of the plug outer housing 13 due to the pressing operation. Afterwards, the plug connector sub-assembly 21 can be removed from the plug outer housing 13 (see lower row in FIG. 6).

Figure 7:
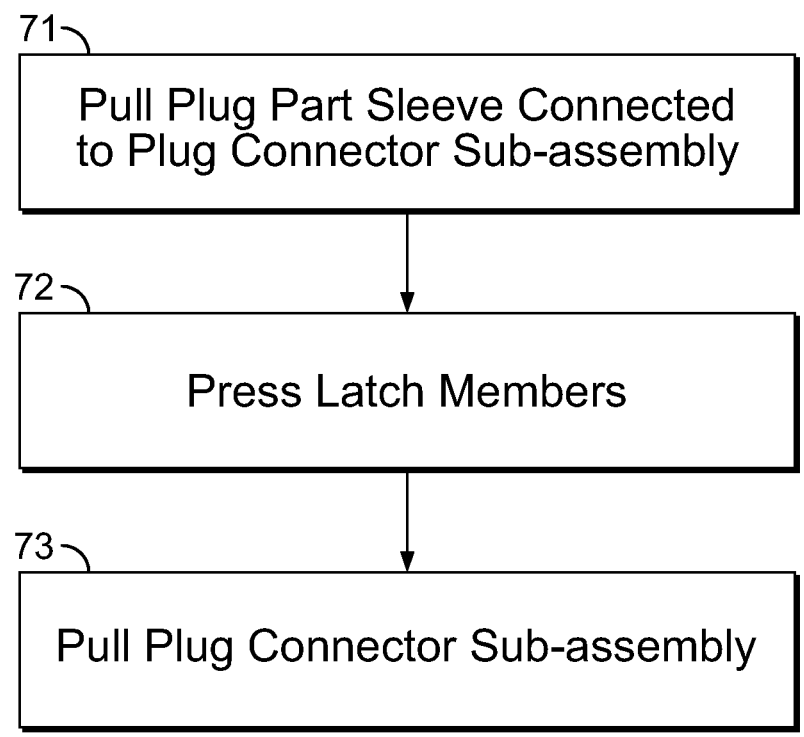
FIG. 7 is a flowchart of a process of disconnecting two sets of optical fibers from each other that are connected to each other by the connector device.
Figure 8:
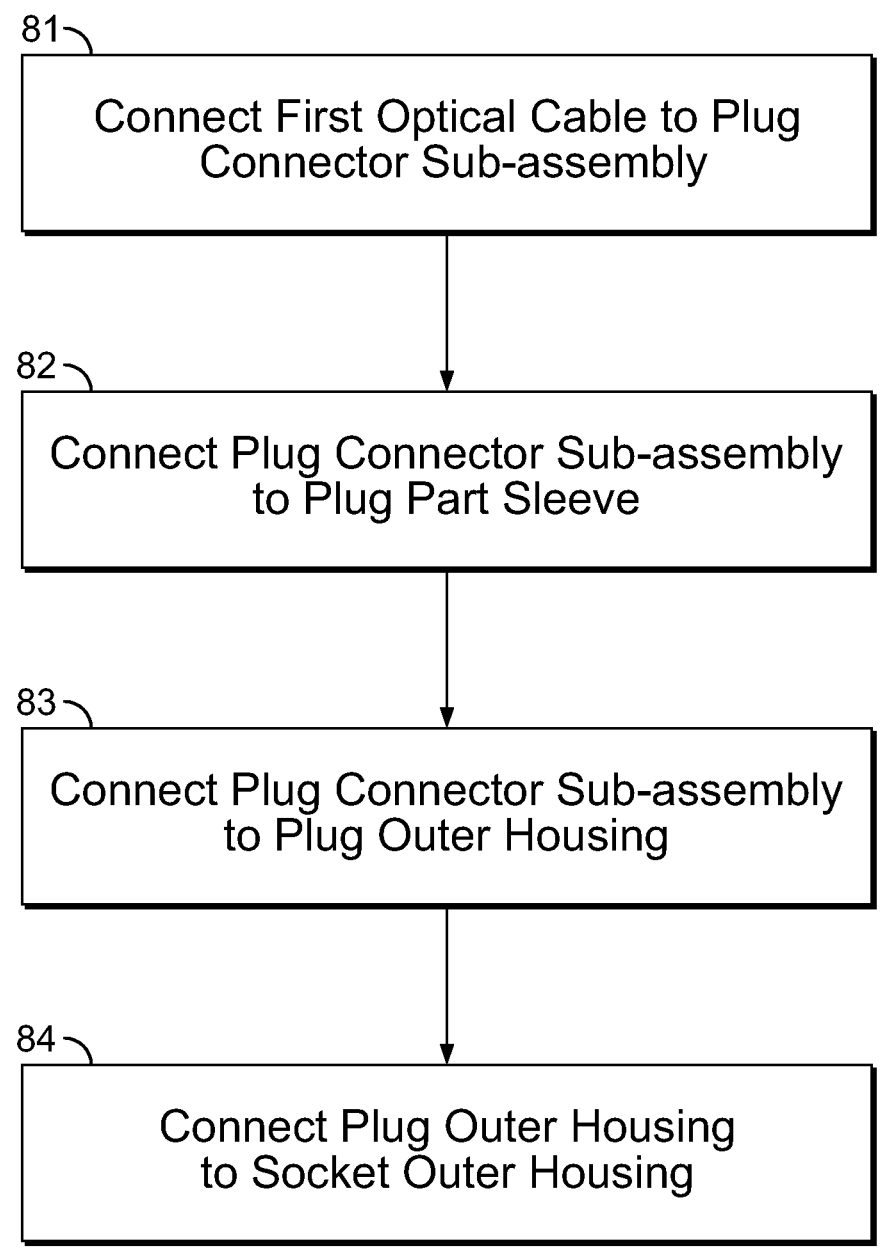
FIG. 8 is a flowchart of a process of connecting two sets of optical fibers to each other by the connector device.

A process of disconnecting two sets of optical fibers from each that are connected to each other by a connector device according to an embodiment of the present invention is illustrated in FIG. 7 and a process of connecting two sets of optical fibers to each other by a connector device according to an embodiment of the present invention is illustrated in FIG. 8. Where appropriate, the order of the shown processing steps may be changed.

In the process of disconnecting optical fibers from each other that are connected by a connector device, for example, the connector device 10 described above, the following steps are involved according to an embodiment as illustrated in FIG. 7 (confer also FIG. 6). The connector device comprises a plug connector part and a receptacle connector part. The plug connector part comprises a plug connector sub-assembly housed in a plug outer housing and a plug part sleeve connected to the plug connector sub-assembly. As illustrated in FIG. 7, a user pulls 71 the plug part sleeve away from the plug outer housing thereby exposing latch members securing the plug connector sub-assembly to the plug outer housing. Next, the user presses 72 the latch members. Afterwards, the user can further pull 73 either the plug part sleeve or the plug connector sub-assembly away from the plug outer housing. In an embodiment, the user pulls the plug connector sub-assembly away from the plug outer house while keeping the latch members pressed. A similar operation may be performed if it is desired to disconnect the connection of the optical fibers at a receptacle part side of the connector device. The pulling and pressing operations can be performed completely by a user's hand only without any need for specialized tools.

In the example shown in FIG. 8, a first optical cable is connected 81 to a plug connector sub-assembly of a plug connector part of a connector device, for example, the connector device 10 described above. The plug connector sub-assembly is connected 82 to a sleeve through which the optical cable was guided before connection to the plug connector sub-assembly. The plug connector sub-assembly is connected 83 to a plug outer housing of the plug connector part of the connector device, for example, by the latch members described above.

Similarly to the process shown in FIG. 8, a second optical cable is connected to a receptacle connector sub-assembly of a receptacle connector part of the connector device. The receptacle connector sub-assembly is connected to another sleeve through which the second optical cable was guided before connection to the receptacle connector sub-assembly. The receptacle connector sub-assembly is connected to a receptacle outer housing of the receptacle connector part of the connector device, for example, by the latch members described above.

As shown in FIG. 8, the plug outer housing of the plug connector part and the receptacle outer housing of the receptacle connector part are connected to each other 84. According to an alternative example, the plug outer housing of the plug connector part and the receptacle outer housing of the receptacle connector part are connected to each other before connecting the plug connector sub-assembly to the plug outer housing and/or the receptacle connector sub-assembly to the receptacle outer housing.

Additional variants of an inventive connector device are illustrated in FIGS. 9a and 9b. As shown in these Figures, a mounting frame 91, 91' may be affixed to the receptacle outer housing 14. The mounting frame 91, 91' may be clipped to the receptacle outer housing 14 by appropriately provided clipping devices. The mounting frame 91, 91' may provide for connection to some user appliances, for example, a printed circuit board or wall receptacle, etc. In the example shown in FIG. 9b, holes are formed in the mounting frame 91' that allow for fixation of the receptacle connector part 12 of the connector device to some appliance by screws.

In all of the above-described embodiments, optical fibers of one single optical cable fastened to the plug connector part 11 of the connector device 10 are connected to optical fibers of another single optical cable fastened to the receptacle connector part 12 of the connector device 10. However, the invention is not restricted to the connection of single optical cables to each other. For example, a pair of optical cables fastened to the plug connector part 11 of the connector device 10 can be connected to another pair of optical cables fastened to the receptacle connector part 12 of the connector device 10. FIG. 10a, accordingly, illustrates a receptacle connector part receptacle 12' comprising a receptacle outer housing 14' to which a pair of sleeves 16, 16' is attached and FIG. 10b illustrates a plug connector part 11' comprising a plug outer housing 13' to which another pair of sleeves 15, 15' is attached. The plug outer housing 13' houses a pair of plug ferrules similar to the ones described above and the receptacle outer housing 14' receptacle outer housing 14 houses a pair of receptacle ferrules similar to the ones described above. In this embodiment, the first sub-assembly 21 has a third ferrule and the second sub-assembly 21' has a fourth ferrule. The first connector part 11 has a third sleeve and the second connector part 12 has a fourth sleeve such that the connector device 10 is configured for connecting one pair of optical conductors (through the first and third ferrules) to another pair of optical conductors (through the second and fourth ferrules). For each of the plurality of optical conductors that are to be connected by the connector device 10, a sub-assembly both in the first connector part 11 and the second connector part 12 may be provided.

A method of connecting a first set of optical fibers to a second set of optical fibers includes providing such a connector device 10, fastening the first set of optical fibers to the first sub-assembly 21 of the first connector part 11, fastening the second set of optical fibers to the second sub-assembly 21' of the second connector part 12, fastening the first sub-assembly 21 to the first outer housing 13, fastening the second sub-assembly 21' to the second outer housing 14, and fastening the first outer housing 13 and the second outer housing 14 to each other. The method may further comprise partly guiding the first set of optical fibers through the first sleeve 15 and fastening the first sub-assembly 21 to the first sleeve 15 and partly guiding the second set of optical fibers through the second sleeve 16 and fastening the second sub-assembly 21' to the second sleeve 16.

The above-described embodiments allow for a quick and easy connection or disconnection of two or more sets of optical fibers. In particular, lengths/lines of optical cables can be easily replaced or permutated, for example, in the event of an operation failure and cleaning of contact faces can easily be carried out. No tools are needed for connection or disconnection of optical fibers/cables.

What is claimed is:

1. A connector device, comprising:
a first connector part including a first outer housing and a first sub-assembly accommodated in the first outer housing, the first sub-assembly having a first ferrule and a first latch member fastening the first sub-assembly to the first outer housing; and
a second connector part including a second outer housing, the second outer housing mating with the first outer housing in a state of coupling the first connector part to the second connector part, and a second sub-assembly accommodated in the second outer housing, the second sub-assembly having a second ferrule and a second latch member fastening the second sub-assembly to the second outer housing, the first outer housing has a locking device for locking and unlocking a coupling of the first outer housing to the second outer housing.

2. The connector device of claim 1, wherein the first connector part includes a first sleeve configured to accommodate a part of a first set of optical fibers.

3. The connector device of claim 2, wherein the second connector part includes a second sleeve configured to accommodate a part of a second set of optical fibers different from the first set of optical fibers.

4. The connector device of claim 3, wherein the first sleeve and/or the second sleeve comprises or consists of a silicone material.

5. The connector device of claim 3, wherein the first latch member has a longitudinal extension connecting the first sub-assembly to the first sleeve.

6. The connector device of claim 5, wherein the second latch member has a longitudinal extension connecting the second sub-assembly to the second sleeve.

7. The connector device of claim 1, wherein the locking device locks and unlocks a coupling of the first outer housing to the first sub-assembly.

8. The connector device of claim 1, wherein the first outer housing has a first fastening device and the second outer housing has a second fastening device, the first fastening device and the second fastening device are configured for fastening the first outer housing to the second outer housing.

9. The connector device of claim 1, wherein the first sub-assembly has a first sealing ring sealing the first sub-assembly against the first outer housing.

10. The connector device of claim 9, wherein the second sub-assembly has a second sealing ring sealing the second sub-assembly against the second outer housing.

11. The connector device of claim 10, wherein the first sealing ring and/or the second sealing ring comprises or consists of a silicone material.

12. The connector device of claim 1, wherein a plurality of guiding keys are formed on surfaces of the first sub-assembly and a plurality of corresponding guiding grooves are formed in inner surfaces of the first outer housing.

13. The connector device of claim 1, wherein a plurality of guiding keys are formed on surfaces of the second sub-assembly and a plurality of corresponding guiding grooves are formed in inner surfaces of the second outer housing.

14. The connector device of claim 1, wherein the first ferrule has a pair of guiding pins and the second ferrule has a pair of guiding holes corresponding to the guiding pins.

15. The connector device of claim 1, wherein the first ferrule and the second ferrule each support ends of a plurality of optical fibers.

16. The connector device of claim 1, wherein the connector device is configured for connecting one pair of optical cables to another pair of optical cables.

17. The connector device of claim 16, wherein the first sub-assembly has a third ferrule and the second sub-assembly has a fourth ferrule, and the first connector part has a third sleeve and the second connector part has a fourth sleeve.

18. The connector device of claim 1, wherein the connector device provides a simplex data connection.

19. A method of connecting a first set of optical fibers to a second set of optical fibers, comprising:
providing a connector device including a first connector part having a first outer housing and a first sub-assembly accommodated in the first outer housing, the first sub-assembly having a first ferrule and a first latch member, and a second connector part having a second outer housing and a second sub-assembly accommodated in the second outer housing, the second sub-assembly having a second ferrule and a second latch member;

fastening the first set of optical fibers to the first sub-assembly;

fastening the second set of optical fibers to the second sub-assembly;

fastening the first sub-assembly to the first outer housing;

fastening the second sub-assembly to the second outer housing; and fastening the first outer housing and the second outer housing to each other, the second outer housing mating with the first outer housing in a state of coupling the first connector part to the second connector part; and locking and unlocking the state of coupling with a locking device of the first outer housing.

20. The method of claim 19, further comprising:

partly guiding the first set of optical fibers through a first sleeve of the connector device and fastening the first sub-assembly to the first sleeve; and partly guiding the second set of optical fibers through a second sleeve of the connector device and fastening the second sub-assembly to the second sleeve.

21. A connector device, comprising:

a first connector part including a first outer housing and a first sub-assembly accommodated in the first outer housing, the first sub-assembly having a first ferrule and a first latch member fastening the first sub-assembly to the first outer housing, the first connector part includes a first sleeve configured to accommodate a part of a first set of optical fibers, the first latch member has a longitudinal extension connecting the first sub-assembly to the first sleeve; and a second connector part including a second outer housing, the second outer housing mating with the first outer housing in a state of coupling the first connector part to the second connector part, and a second sub-assembly accommodated in the second outer housing, the second sub-assembly having a second ferrule and a second latch member fastening the second sub-assembly to the second outer housing, the second connector part includes a second sleeve configured to accommodate a part of a second set of optical fibers different from the first set of optical fibers.

22. The connector device of claim 21, wherein the second latch member has a longitudinal extension connecting the second sub-assembly to the second sleeve.

23. A connector device, comprising:

a first connector part including a first outer housing and a first sub-assembly accommodated in the first outer housing, the first sub-assembly having a first ferrule and a first latch member fastening the first sub-assembly to the first outer housing; and a second connector part including a second outer housing, the second outer housing mating with the first outer housing in a state of coupling the first connector part to the second connector part, and a second sub-assembly accommodated in the second outer housing, the second sub-assembly having a second ferrule and a second latch member fastening the second sub-assembly to the second outer housing, a plurality of guiding keys are formed on surfaces of the first sub-assembly and a plurality of corresponding guiding grooves are formed in inner surfaces of the first outer housing or a plurality of guiding keys are formed on surfaces of the second sub-assembly and a plurality of corresponding guiding grooves are formed in inner surfaces of the second outer housing.

\* \* \* \* \*